United States Patent
Welch

[15] 3,653,182
[45] Apr. 4, 1972

[54] WATER CONDITIONING METHOD AND APPARATUS

[72] Inventor: Louis S. Welch, Sunnyvale, Calif.
[73] Assignee: M. Lewis Hall, Sr., Punta Gorda, Fla.
[22] Filed: Jan. 21, 1970
[21] Appl. No.: 4,720

[52] U.S. Cl..................................55/53, 55/196, 261/78, 261/116
[51] Int. Cl........................................B01d 19/00
[58] Field of Search..................55/42, 44, 53, 196, 200, 201; 261/115, 134

[56] References Cited

UNITED STATES PATENTS

| | | | |
|---|---|---|---|
| 2,247,897 | 7/1941 | Wahlin | 239/468 |
| 2,559,129 | 7/1951 | Miller | 55/44 X |
| 2,869,674 | 1/1959 | Vandenburgh | 261/111 |
| 3,151,064 | 9/1964 | Lathrop | 55/53 X |

*Primary Examiner*—Reuben Friedman
*Assistant Examiner*—R. W. Burks
*Attorney*—Stevens, Davis, Miller & Mosher

[57] ABSTRACT

A method and apparatus are disclosed wherein air and water are simultaneously introduced under high pressure, concurrently upwardly, within a confined zone. Air is introduced from a point immediately below the water inlet point and travels upwardly at high velocity. Water is introduced thereabove in a manner to form extremely finely divided particles moving upwardly as a swirling mass. Because of the velocity of water and air introduction, the water droplets are driven with high impact against the upper surface of the confined zone and thereafter proceed downwardly. The impact of the water droplets against the upper surface causes them to be reshaped and broken apart, thereby providing still greater overall water-air exposure. By reason of the constant flow of high velocity air, the particles are maintained in suspension for a long period of time. Both air and water preferably are heated, especially in use under cold climatic conditions. As a result of the described mode of treatment, a high degree of water purification in various respects is accomplished. During the water and air intermingling, the water treating zone is vented for release of impurity-laden air. The particular apparatus disclosed is especially adapted for water storage, including automatic water shutoff and flow responsive to periodic water use, as may be especially desirable in home installations.

16 Claims, 3 Drawing Figures

INVENTOR
LOUIS S. WELCH

WATER CONDITIONING METHOD AND APPARATUS

This invention relates to water conditioning methods and apparatus having the objective of rendering water free of dissolved materials which are extremely distasteful and malodorous, and which bring about discoloration of surface with which the water comes into contact. The methods and apparatus are hereinafter described.

By way of initial discussion, the invention includes a novel approach to aeration of water, involving simultaneous introduction of air and water into a confining zone or chamber, both in a generally upward direction and under high pressure, and the bringing about of highly intimate contact therebetween. Air introduction is upward from beneath the level of water introduction, the water being delivered upwardly into the chamber as a very fine, swirling dispersion. In consequence of the resulting manner of water air engagement, the air acts to disintegrate the water further, i.e., beyond its original particle size upon introduction into the contact zone, and to maintain the water in a very high state of dispersion, there being extremely intimate air-contact with the water. The water is propelled upwardly with great force, since the force of the air velocity tends to be additive to that of the water, it being generally in the same direction. The air and water are introduced relatively near the upper confining surface of the chamber, i.e., sufficiently near that the water is driven with great force and impact against such surface, with the result that the particles of water are further broken into still smaller particles, perhaps almost to the vapor state, and probably so in large measure. Thus, further and even more intimate air-water contacting is provided than upon initial introduction.

Following impacting of the water against the upper surface, the water particles then tend to settle downwardly to a storage zone in the bottom portion of the tank; however, since the air introduction is constant and upward, the particles, in the overall, fall out of suspension in the contact zone to the storage zone at a modified rate, i.e., in the main each particle remains above the point of air introduction for a longer time than if each were free to fall under gravity. Consequently, each particle is exposed to air-contact for an increased period of time than would be the case under unimpeded fall-out due to the force of gravity.

From the foregoing it can readily be envisioned that both the entering and falling water particles are constantly being driven against the upper chamber surface over and over again according to some statistical probability factor, perhaps impossible to determine with absolute accuracy, and that their residence time in the zone above the point of air introduction is lengthened accordingly and significantly. Further, it will be apparent that during this time substantially the entirety of the water, not merely the surface of relatively large droplets, becomes available by reason of constant "droplet" disintegration for actual contact with air. As should be appreciated upon consideration of this, contaminants in the water e.g., sulfur gases are afforded a much greater opportunity for release from solution, and oxidizing effects of the air is more complete in relation to the total volume of water. Stated another way, by reason of this invention as briefly described above the average size of the particles inhabiting the air-contacting zone is caused to be very small and the number of such particles is very large, resulting in a great increase in total surface area of water exposed, while also increasing the time of exposure, these conditions leading to greater purification results. Heating of the air affords still further improvement.

The apparatus of the invention to be described hereinafter in detail provides for constant release of impurities from the treating zone and collection of the freshly conditioned water in the bottom zone of the treating chamber from which it may be drawn off. Water level in the apparatus is automatically maintained by suitable valving.

Insofar as is known, no one heretofore has brought high pressure water and high pressure air together in the manner of this invention; moreover, impacting of the water upwardly against the chamber surface as a further feature is not believed to have been suggested heretofore. Also, the feature of maintaining the water in air suspension so as to gain the advantage of additional time of air-water contact is believed to be entirely novel.

Figure 1:
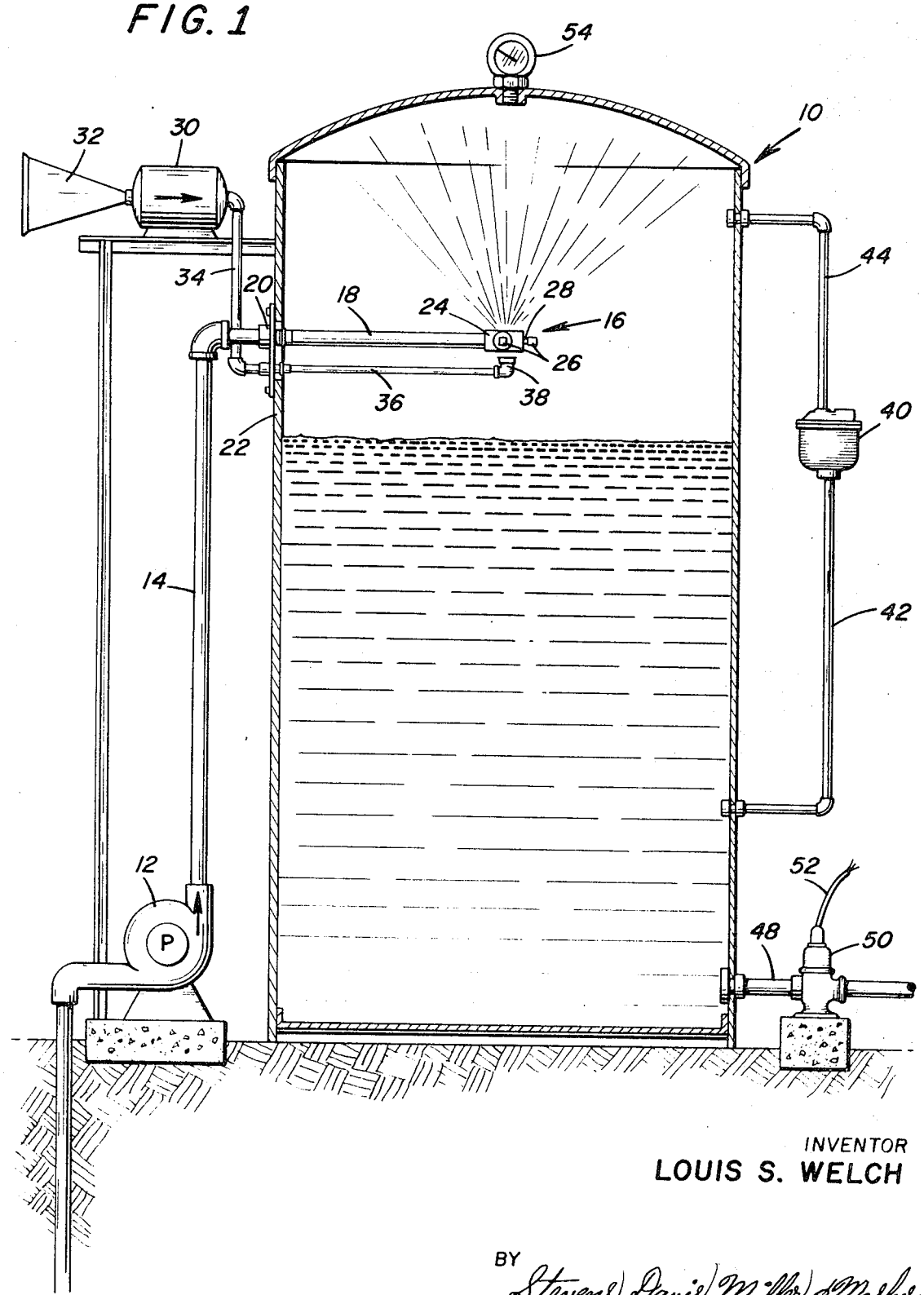
FIG. 1 is a view in elevation of the parts of the assembled apparatus, the chamber being in section in order to show the interior.
Figure 2:
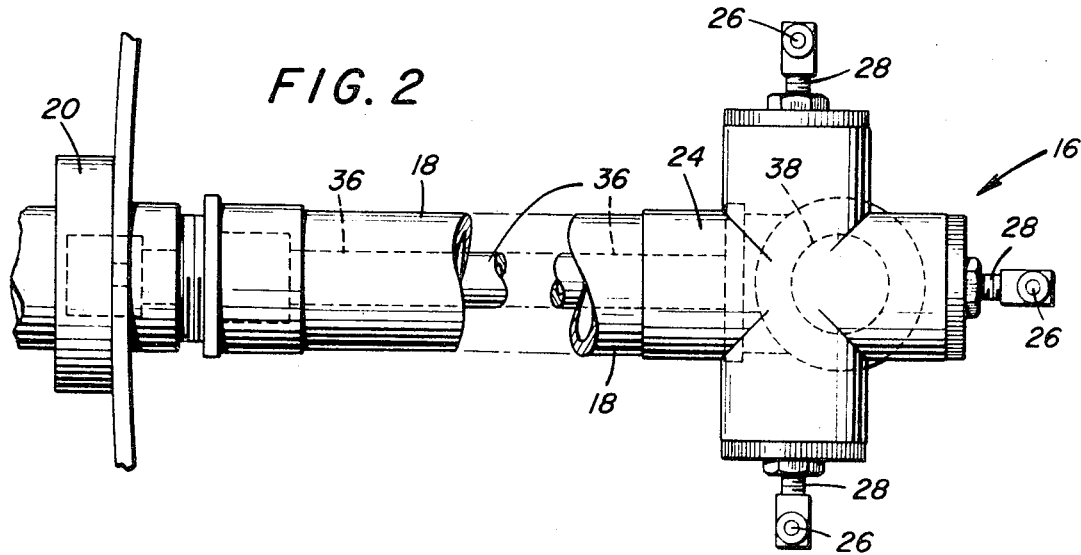
FIG. 2 is a top plan view of the water delivery means.
Figure 3:
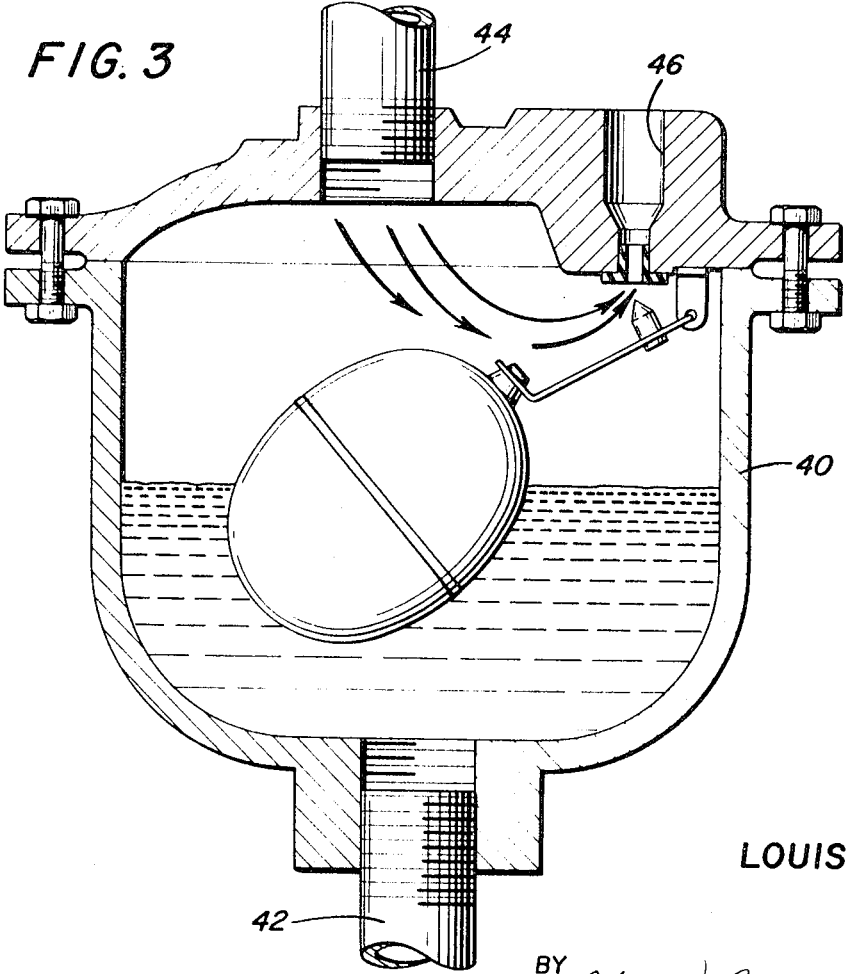
FIG. 3 is a partial sectional view of a control valve shown in FIG. 1.

Referring to the drawings, numeral 10 denotes a tank, which may be of any suitable corrosion resistant material and capacity, in which the purification method of this invention is applied and the treated water is stored for use. Numeral 12 denotes a high head pump for delivery of water from an underground source under suitable pressure, preferably not less than about 50 p.s.i. Numeral 14 denotes a line of piping (1 ¼inches) coupling the pump with the water discharge apparatus 16, seen located within the tank relatively near the top, and centrally thereof.

The water discharge apparatus 16 includes a feeder pipe 18 joining at one end with a coupling fitted through the tank wall 22, and at the other end with distributor head denoted by numeral 24. The distributor head carries a plurality of nozzles, three being shown by way of example, and denoted by numeral 26. Water passes to the nozzles via ⅜ inches stepdown bushings 28. Nozzles 26 may be of any suitable fine mist or atomizing type; however, a particularly effective nozzle, which is preferred, is of the well-known whirlajet type described in U.S. Pat. No. 2,247,897 of the Spraying Systems Company. This nozzle shreds the water to an extremely fine particle state, which is quite important in the overall purification method, and discharges it at high velocity as a swirling, upwardly moving dispersion.

Numeral 30 denotes an air compressor which draws air through air heater and filter means 32 and delivers into or through, lines 34 and 36 to an air distributor 38. It is found that a marked increase in air temperature increases purification efficiency, especially in areas where both air and water temperature are low. It is apparent that the heat thereby imparted to the water increases vaporization rate of the water, thereby bringing about highly intimate air and water contact and affording more rapid and thorough release of impurities contained therein. Also, heat increases the rate of impure gas departure from the water droplets, as well as tending to disrupt the droplets. The air heater may be located on the delivery side of the compressor if desired immediately adjacent the tank, or even within the interior of the tank if desired, suitable provision being made for protection of the electrical components. It is envisioned that there may be an air temperature level at which overall purification and operational efficiency diminishes due to such considerations as reduced oxygen quantity in highly heated air at a given delivered pressure, the nature of impurities present in the water, water input temperature, rate of water drawoff, internal tank pressure and similar factors involved in the highly complex gas-vapor system; however, such is not a certainty and, in any event, the question can be learned with respect to a given water by comparative chemical and biological analysis thereof following treatment at increasing temperature levels according to well-known principles and techniques. Moreover, for ordinary purpose, air and/or water heating may involve unnecessary costs in energy and equipment. According to the present invention, highly improved results have been obtained without air or water heating and therefore the invention is not restricted to such heating. The heater discussed herein is a 700 watt heater, the air being drawn in over the heating elements and on to the compressor. The compressor is of a capacity such as to deliver air at at least 50 p.s.i. via line 36 (one-half inch) to the nozzle. As will be understood the fluctuating temperature of the ambient (atmospheric) air will result in a corresponding change in temperature in the air delivered to the tank, unless automatic temperature means are employed. However, the temperature of air delivered is found to be approximately 25° F. above ambient in the above-described equipment. It has been found that better results are obtained by providing an air temperature of at least 75°–80° F., and that such results improve with increasing temperature.

The air distributor 38 may be of any suitable type capable of delivering the air generally in an upward direction and distributing it substantially evenly relative to the water distributor. An upward cone-like distribution achieves the desired effect to a high degree. By an upward direction is meant an upward angle of not less than about 45° in order that the overall effect of maintaining the greatest amount of water in the upper treating zone for the longest time is achieved. Similar considerations apply to the water being discharged from the nozzles. It is felt that about a 60°–80° angle from the horizontal provides the best distribution for both air and water. Moreover, several air distributors can be employed, located about the tank axis at a distance away from the general axis of water distribution and much the same effect is achieved. In such case the upward angle may be somewhat sharper. It is felt that the general principles involved can be readily applied for best results in particularly selected apparatus without restricting the specification herein to precise angular relationships. It is the general concept of concurrent air-water upwardness that is important to employ, regardless of numbers of nozzles and points of location laterally of the contact zone.

Numeral 40 denotes a float valve unit mounted at a height of approximately two-thirds that of the tank 10. The purpose of this valve unit is to maintain pressure in the tank when the system is not in operation and to permit the discharge of gaseous impurities from the zone above the water level when water is undergoing treatment. Valve unit 40 is connected to the water storage supply via line 42 and to the gas zone thereabove via line 44. The float valve of the unit opens and closes gas discharge port 46, which leads to the atmosphere. Thus, air laden with impurities leaves the tank through line 44, passes through the float valve unit 40 and exits to the atmosphere through port 46 during water treatment, and so long as the float valve remains open.

Numeral 48 denotes a water drawoff line connecting into the lower portion of the water storage zone. Mounted in line 48 is a pressure switch 50, which is responsive to pressure in the tank in serving to simultaneously activate the water pump and air compressor via wiring 52 when pressure in the line drops to a predetermined point following water drawoff. Conversely, as the water rises in the storage tank, during water introduction via the source line the float valve closes, sealing the tank against pressure loss, following which pressure builds up in the system and switch 50 then opens at its pressure opening point to shut off electric power. The illustration of the circuitry is omitted, such being conventional and obvious. Actual pressure in the tank is observable from pressure guage 54 mounted in the top wall of the tank.

Pressure switch 50 is of a conventional type and may be adjusted to open and close at any desired point within its operating range, for example, about 20–40 p.s.i. in relation to the other equipment. Preferably, switch 50 is set to open at a pressure which is considerably less than the normal, fully built up tank pressure when the equipment shuts down, thereby avoiding frequent start up of the equipment following the drawing of only small quantities of water, as is the case in home installations.

In a typical home installation, the pressure switch is regulated to effect actuation of the water pump and the air compressor at approximately 20 p.s.i. and to effect their shutdown at about 40 p.s.i. In operation, assuming the equipment to be inactive and the tank at its maximum contemplated water volume, as water is drawn and the water level in the tank falls, a point is reached at which the float valve opens the vent 46, thus permitting escape of gases and consequent pressure drop beyond that due to water drawoff. The point at which the vent normally would open due to water drawoff is established at about 35 p.s.i. As the gases leave the interior of the tank, the pressure continues to drop; and when it reaches about 20 p.s.i. the pump and compressor begin delivery of water and air into the upper portion of the tank. Since the input of water and air at their pressure and rate of delivery exceeds the exit of gases through vent 46, pressure builds up within the tank. The discharge of impurity-laden gases will continue until the water level effects closing of the vent 46, following which the pressure will continue to build up until it reaches about 40 lbs. at which point the delivery of water and air will cease as the pump and compressor shut down. In such an installation involving, for example, a 120 gallon capacity tank, a 1 horsepower pump and three-quarter or 1 horsepower compressor are employed.

As will be understood, the quantity of air relative to the quantity of water is desirably higher as the impurity content of the water increases. Since the object of the equipment is to produce portable water it is important that equipment be selected which does not induce contaminants. In particular, it is important to select equipment which is oilless or, the so-called dry compressor, for example, as is sold by Bell and Gossett.

From the foregoing, it is believed that the manner of operation of the method and apparatus of the invention will be readily understandable, and further specific discussion of its operation is not considered necessary to be submitted. As pointed out heretofore the start-up of the equipment involving simultaneous introduction of water and air occurs when pressure in the tank drops due to water drawoff, and the equipment shuts down following raising of the water level, the closing of the float valve and when internal pressure has been restored to the pressure switch cutoff point. The overall capacity of the apparatus is purely a matter of design, as well as is its water recovery time. The methods and apparatus of the invention are applicable to large scale commercial as well as home use and the invention may be employed in conjunction with other water treating apparatus.

By reason of occurrences in the method and apparatus of the invention which are not entirely understood, it is found that modification in the chemical content of normally hard water apparently takes place such that the treated water is rendered highly compatible with detergents. Thus, it appears that modification of such salts as calcium and magnesium salts, are chemically changed. On the other hand, it may be that these and other salts which are dissolved in water are actually eliminated with noxious gases. Also, in addition to this and the elimination of noxious gases, the bacterial content of the treated water is greatly reduced.

As will be understood, the heart of the invention is in the introduction of water and air concurrently in an upward direction, both water and air being introduced in highly dispersed state and under considerable pressure. Accordingly, details of the apparatus which have to do with mechanical aspects such as pressure regulation and flow control, are by no means rigid. As will be understood, the method and apparatus of the invention may operate continuously, and any number of installations may be set up in tandem in order to afford more intense water treatment where desirable. In other words, a given volume of water may be processed through a series of installations of the type herein described in order to achieve removal of difficult impurities or more thorough treatment.

What is claimed is:

1. A method of water purification including discharging water as a finely dispersed mist-like flow upwardly into a confined zone under high pressure and simultaneously delivering high pressure air or oxygen containing gas from a point immediately below the point of water introduction upwardly into the water mist, the pressures of the water and air being of a magnitude such that the water mist is driven toward the upper area of the confining zone under substantial velocity; collecting the water falling from the treating zone in a storage zone and continuously venting the impurity-laden air from the treating zone, the angle of flow of air and water being, in the main, at an angle of not less than about 45°, the upward thrust of air and water thereby being additive and having the effect of maintaining individual water mist particles above the point of air input, and thus under exposure to incoming fresh air, for an extended period of time, while also tending to repeatedly disrupt said individual particles by repeated contact with the incoming fresh air.

2. The method as claimed in claim 1 wherein the water is delivered from a plurality of orifices and substantially the entirety of the water is projected upwardly at an angle substantially above the horizontal plane from which it is introduced.

3. A method as claimed in claim 2 wherein the water is projected upwardly as a swirling mist.

4. The method as claimed in claim 1 wherein the water is propelled upwardly into impact with the upper surface of the confined zone.

5. The method as claimed in claim 3 wherein the water is propelled upwardly into impact with the upper surface of the confined zone.

6. The method as claimed in claim 1 wherein the air is introduced at an elevated temperature.

7. The method as claimed in claim 3 wherein the air is introduced at an elevated temperature.

8. The method as claimed in claim 4 wherein the air is introduced at an elevated temperature.

9. Water treating apparatus comprising a tank constituting a lower storage zone and an upper treating zone; means for delivering water upwardly under high pressure and in a finely dispersed mist-like state into the treating zone; means for delivering air under high pressure from a point immediately below the point of water introduction upwardly into the treating zone into said water mist; and means for controlling the input of air and water to said zone according to a predetermined need, the said water and air delivering means directing their respective inputs upwardly at angles not less than about 45°, and being disposed generally coaxially, whereby the thrust of air and water becomes additive and has the effect of maintaining individual water mist particles above the point of air input, and thus under exposure to incoming fresh air, for an extended period of time, while also tending to repeatedly disrupt said individual particles by repeated contact with the incoming fresh air.

10. The apparatus as claimed in claim 9 wherein said water and air introduction means are positioned at a point near the top of the said tank and said means effects impact of said water against the top surface of said tank.

11. The apparatus as claimed in claim 10 wherein said water delivery means effects projection of the said water as a finely divided, swirling mist.

12. The apparatus as claimed in claim 11 wherein said tank is provided with a venting means which opens and closes according to water level in the tank; and said tank is provided with water outlet means and a pressure responsive switch directly controlling a pump and an air compressor whereby they are energized and de-energized according to a predetermined range of pressure established for said tank.

13. The apparatus as claimed in claim 12 wherein said water delivery means is positioned substantially axially.

14. The apparatus as claimed in claim 12 wherein said water delivery means includes a plurality of orifices.

15. The apparatus as claimed in claim 9 wherein said water is delivered from a plurality of orifices located in said treating zone and each of said orifices is provided with air introduction means located substantially immediately therebelow.

16. The apparatus as claimed in claim 12 wherein said water is delivered from a plurality of orifices located in said treating zone and each of said orifices is provided with air introduction means located substantially immediately therebelow.

* * * * *